United States Patent Office 2,990,585
Patented July 4, 1961

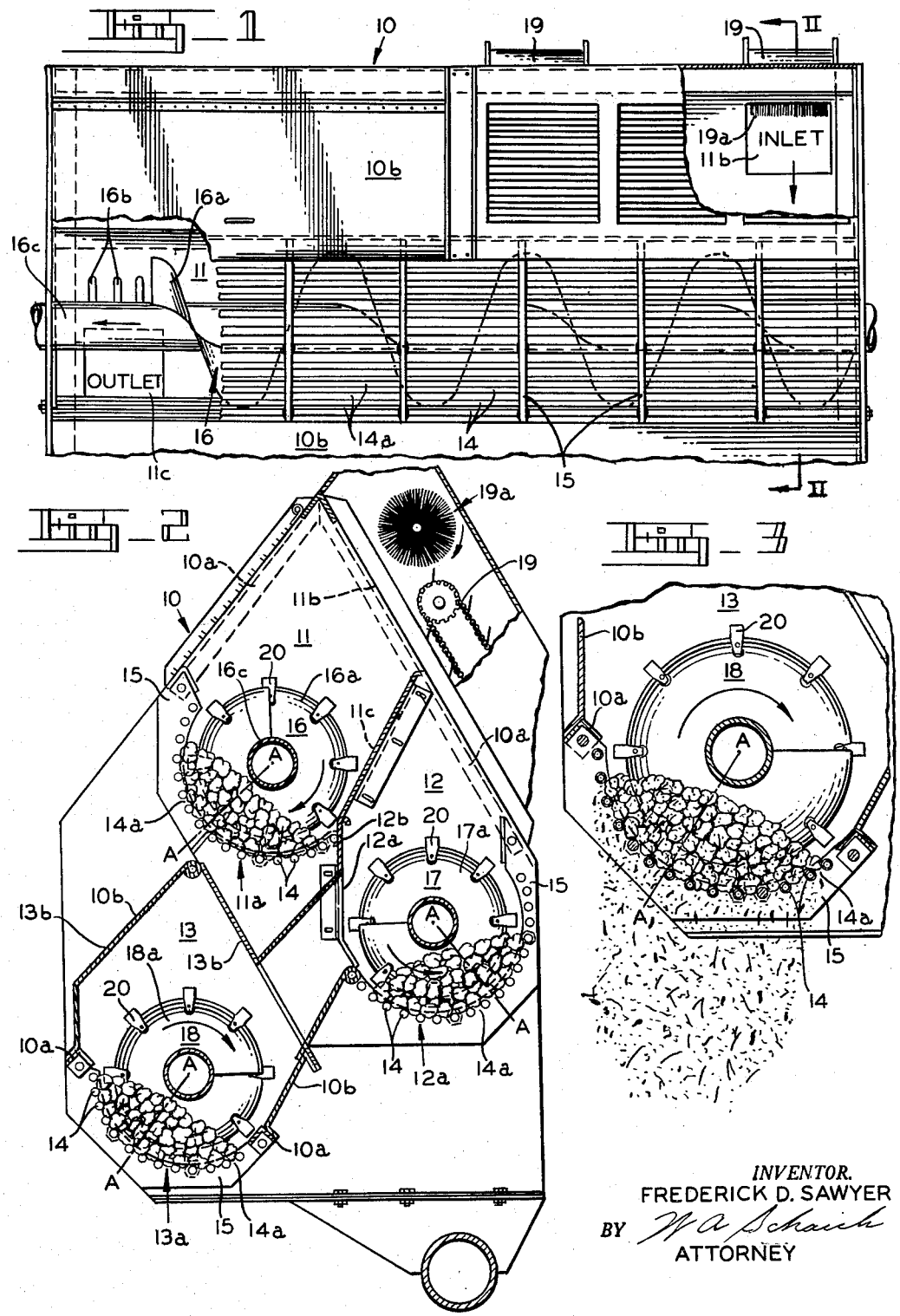

2,990,585
COTTON CLEANING APPARATUS
Frederick D. Sawyer, 412 Greenwood, Birmingham, Mich., assignor of twenty-five percent to Wilbur A. Schaich, Maumee, Ohio
Filed Jan. 14, 1957, Ser. No. 633,989
2 Claims. (Cl. 19—67)

This invention relates to a cotton cleaning mechanism, and particularly to a cleaner for use with field harvesting units to effect the initial separation of the cotton lint from the dirt, trash and empty bolls that are inherently mixed with the cotton as a result of the harvesting operation.

Substantial acreages of cotton, particularly of the low bush type, are now harvested by mechanical stripping units. Since such units always involve the passage of the entire cotton plant through the nip of a pair of cooperating rolls or brushes, it is inherent in such harvesting operation that substantial quantities of leaves, twigs, empty bolls and other trash become intertwined with the cotton and hence the cotton arrives at the gin in an unusually dirty condition. This results in a downgrading of the cotton due to the additional cleaning effort that must be performed by the gin, but also involves economic losses due to the increased transport space required by the trash and the disposal of the trash when finally separated from the cotton lint.

Accordingly, it is an object of this invention to provide an improved cotton cleaner of unusually compact and simplified construction permitting such cleaner to be directly mounted upon a cotton harvesting unit to effect an initial cleaning operation during the harvesting of the cotton.

A particular object of this invention is to provide an improved design of a cotton cleaning unit which will impart a vigorous and effective cleaning action to freshly harvested cotton and yet is so compact in design as to permit the cleaning unit to be mounted intermediate a field harvesting unit and the wagon or basket conventionally associated with such harvesting unit.

Still another object of this invention is to provide an improved cleaning unit for freshly stripped cotton which will effect separation and discharge back to the field of plant type trash such as leaves, twigs and empty bolls.

The specific nature of this invention, as well as other objects and advantages thereof, will become apparent to those skilled in the art from the following detailed description, taken in conjunction with the annexed sheets of drawings on which, by way of preferred example only, are illustrated two embodiments of this invention.

FIG. 1 is a partial rear elevational view, partly in section, of a cotton cleaning unit embodying this invention.

FIG. 2 is a sectional view taken on the plane 2—2 of FIG. 1.

FIG. 3 is an enlarged scale vertical sectional view taken through one of the cleaning units embodying this invention.

As shown in FIG. 1, a cotton cleaning unit embodying this invention may be mounted in a housing 10 formed by a welded skeleton of angle bar members 10a covered by sheet metal sections 10b. As best shown in FIG. 2, the housing 10 defines a plurality of horizontally extending, elongated cleaning chambers 11, 12, and 13. In the specific application of the cleaner embodying this invention to a field harvesting machine, the length of the cleaning chambers 11, 12, and 13 corresponds approximately to the maximum width permitted for the harvesting machine and the housing 10 may be conveniently mounted on the harvesting machine at a position rearwardly of the one or more cotton stripping units (not shown) carried by the machine. The cleaning chambers 11, 12, and 13 are disposed in vertically staggered relationship so that the open bottom portions 11a, 12a and 13a of the respective cleaning chambers do not directly overlie each other. In the interests of compactness, the uppermost cleaning chamber 11 may be positioned horizontally intermediate the middle chamber 12 and the lower chamber 13.

The open bottom portions of each of the cleaning chambers are traversed by a plurality of arcuately spaced horizontal rods 41. In each of the cleaning chambers, the array of rods 14 defines in vertical section substantially a semicircular arc and these arcuate arrays of rods function respectively as the cleaning grid in each of the cleaning chambers 11, 12, and 13. To impart the required rigidity a plurality of arc-shaped transverse brace rods 15 are welded to the cleaning rods 14 at spaced intervals.

Helical conveyors 16, 17 and 18, which are of substantially identical construction, are then respectively rotatably mounted in each of cleaning chambers 11, 12, and 13 in concentric relationship to the arcuate array of cleaning rods 14 respectively provided at the bottom of each such chamber. If it is desired to use identical helical conveying units, then the direction of rotation of the helical conveyor 17 which is mounted in the intermediate chamber 12 is reversed from that of the conveyors 16 and 18 which are respectively mounted in cleaning chambers 11 and 13. Alternatively, the pitch of the helix blade 17a on helical conveyor 17 could be reversed from the pitch of the helix blades 16a and 18a and then all three helical conveyors rotated in the same direction by conventional driving mechanisms (not shown). In either event, the top and bottom conveyors 16 and 18 respectively produce an axial movement of uncleaned cotton reverse to that produced by the intermediate helical conveyor 17. The cotton to be cleaned is fed into the uppermost cleaning chamber 11 by one or more input conveyors 19 which transport freshly stripped cotton to a point opposite an inlet opening 11b in the cleaning chamber 11 and the uncleaned cotton is discharged into the chamber 11 through such opening by a rotating doffing brush 19a. The inlet openings 11b are preferably disposed above and closely adjacent to the input side of the helical conveyor 16. At the other end of cleaning chamber 11, corresponding to the discharge end of the helical conveyor 16, a transfer outlet opening 11c is provided in the sheet metal wall separating cleaning chambers 11 and 12, and the partially cleaned cotton is discharged through such transfer opening into the cleaning chamber 12 where it is picked up by the input end of the helical conveyor 17. The discharge of the partially cleaned cotton from helical conveyor 16 may be assisted by ending the helix blade 16a short of the end of the conveyor and providing a plurality of radially exposed spikes 16b on the shaft 16c of such conveyor, which spikes throw the partially cleaned cotton into the transfer passage 11c.

The partially cleaned cotton is then transported axially through the length of cleaning chamber 12 by helical conveyor 17 and is then discharged downwardly through a transfer opening 12a in the sheet metal wall separating cleaning chambers 12 and 13. The partially cleaned cotton is then picked up by the input end of the helical conveyor 18 and transferred axially through cleaning chamber 13 to a suitable outlet (not shown) at the discharge end of the helical conveyor 18.

Each of the helical conveyors 16, 17 and 18 are preferably provided with a plurality of readily detachable kicker elements 20 which comprise radial projections rigidly but detachably secured at spaced intervals along the respective helix blade. The radial tips of kicker elements 20 pass in close proximity to the corresponding arcuate array of cleaning rods 14. Kicker elements 20 are thus effective to produce a rolling of the cotton lint and adhering trash along the arcuate grid of cleaning rods 14 and hence permit the trash to be separated from the cotton and to fall between the spaces 14a provided between the cleaning rods 14. The spaces 14a are of course selected to be sufficiently close to prevent any substantial loss of cotton lint and yet are wide enough to permit a majority of the trash to fall therethrough as illustrated in FIG. 3. The actual number of kicker elements 20 is varied according to the desired vigorousness of the cleaning action. The more kickers employed, the greater is the radial movement of the cotton for a given increment of horizontal travel.

The trash discharged from the lower cleaning chamber 13 and the intermediate cleaning chamber 12 falls directly to the ground. The trash discharged from the uppermost cleaning chamber 11 is deflected by a V-shaped sheet metal wall 13b forming the top portion of cleaning chamber 13 to fall to the ground on either side of the cleaning chamber 13. A vertical sheet metal wall 12b is provided intermediate the cleaning chambers 11 and 12, a position where it is substantially tangential to both helical conveyors 16 and 17 and this wall prevents trash discharged from the right-hand end of the cleaning rods 14 of cleaning chamber 11 from entering the cleaning chamber 12.

It should be particularly noted that the center of each of the arcuate arrays of cleaning rods 14 is angularly displaced relative to a vertical plane passing through the corresponding helical conveyor axis. Depending upon the speed of rotation of the helical conveyors, it has been observed that the center of gravity of the mass of cotton transferred by such conveyor will lie along a radial plane, such as indicated by the line A—A, which is angularly displaced from a vertical plane passing through the helical axis in the direction of advancing rotation of the corresponding helical conveyor. The corresponding angular shift of the arcuate array of cleaning rods permits the more efficient utilization of the entire cleaning surface presented by such arcuate array of rods and contributes greatly to the improved efficiency of this cotton cleaning machine.

I claim:

1. Apparatus for removing trash from cotton comprising a housing defining an open bottom elongated horizontal chamber, a plurality of spaced horizontal rods longitudinally traversing the open bottom portion of said chamber, said set of rods defining an arcuate array in vertical cross section, said rods being spaced to permit trash to pass therebetween but close enough to retain cotton lint, a helical conveyor rotatably mounted in said chamber in coaxial relationship to said arcuate array of rods and extending the length of said chamber, a plurality of radial projections spaced along the periphery of said helical conveyor, said projections extending into close radial proximity to said rods, thereby effecting a transverse rolling of the cotton lint across said arcuate array of rods, means on said housing defining an inlet communicating with one end of said helical conveyor to feed unclean cotton thereto, and means on said housing defining a cotton outlet communicating with the other end of said helical conveyor, said helical conveyor being rotated in the direction to axially advance cotton from said one end to said other end.

2. The combination defined in claim 1 wherein said radial projections are detachably secured to the periphery of said helical conveyor, whereby the total number of said projections may be varied to adjust the effectiveness of the cleaning action.

References Cited in the file of this patent

UNITED STATES PATENTS

| | | |
|---|---|---|
| 1,235,427 | Bridewell et al. | July 31, 1917 |
| 1,987,241 | MacKenzie | Jan. 8, 1935 |
| 1,989,751 | Hagler et al. | Feb. 5, 1935 |
| 2,031,587 | Blewett | Feb. 25, 1936 |
| 2,121,722 | Wright | June 21, 1938 |
| 2,739,353 | Mitchell et al. | Mar. 27, 1956 |

FOREIGN PATENTS

| | | |
|---|---|---|
| 116,772 | Great Britain | June 27, 1918 |